United States Patent [19]
Revilla et al.

[11] Patent Number: 5,561,614
[45] Date of Patent: Oct. 1, 1996

[54] METHOD AND APPARATUS FOR TESTING PIN ISOLATION FOR AN INTEGRATED CIRCUIT IN A LOW POWER MODE OF OPERATION

[75] Inventors: Juan G. Revilla; Alfred L. Crouch, both of Austin, Tex.

[73] Assignee: Motorola Inc., Schaumburg, Ill.

[21] Appl. No.: 380,893

[22] Filed: Jan. 30, 1995

[51] Int. Cl.$^6$ .................................................. G05B 23/02
[52] U.S. Cl. ........................................ 364/579; 371/22.1
[58] Field of Search ...................................... 364/579, 707, 364/948.8, 232.8; 371/22.1, 22.5, 22.3, 28, 27, 22.6, 21.1; 324/73.1, 537, 763, 512, 522, 523, 527, 765, 158.1; 365/201, 226, 227, 229

[56] References Cited

U.S. PATENT DOCUMENTS 5,377,200  12/1994  Pedneau ................................ 371/22.5

Primary Examiner—James P. Trammell
Assistant Examiner—Tony M. Cole
Attorney, Agent, or Firm—Keith E. Witek

[57] ABSTRACT

A low power mode of an integrated circuit (IC) 10 is tested via a test controller 50. The IC 10 is placed in a low power mode where a plurality of pins represented by the pins 82, 72, and 62 are isolated from the internal circuitry, such as CPU 30, via circuits 60, 70, and 80. It is difficult, if not impossible, to test the IC 10 when in a low power mode since all pins are isolated from external circuitry and all clocks are stopped. Therefore, in order to test the low power mode, the test controller 50 can be selectively taken-out of low power mode via a RESET IN signal while all other circuitry in the IC 10 remains in the isolated low power mode. Test controller 50 can then conduct logical low power internal testing of the IC 10 while it is in low power mode and isolated. This testing in done by communicating data via the DATA IN and DATA OUT pins in a serial scan chain manner.

33 Claims, 4 Drawing Sheets

METHOD AND APPARATUS FOR TESTING PIN ISOLATION FOR AN INTEGRATED CIRCUIT IN A LOW POWER MODE OF OPERATION

FIELD OF THE INVENTION

The present invention relates generally to data processing systems, and more particularly, to testing low power isolation of pins in a data processing system.

BACKGROUND OF THE INVENTION

A low-power mode of operation for microprocessors is becoming increasingly important as more portable products and battery operated products are developed for consumers. Typically a low power mode will disable or tri-state external pins of the integrated circuit (IC) to eliminate current drain due to voltage mismatches between external pins and internal circuitry and disable/stop clocks to reduce switching and power drain over time. In order to exit a low power mode of operation, typically an external signal or an interrupt is input to the integrated circuit and the integrated circuit "wakes up" in response to this external signal or interrupt. "Waking up" is usually referring to enabling/restarting the clock and bringing the IC pins out of their tri-state configuration.

One problem with low power modes is that low power modes are difficult to test and verify in the manufacturing phase. Once a low power mode is entered it is clear that the integrated circuit has no accessible inputs/outputs (all of them have been tri-stated) and have no clock in which to switch states or operate. A design defect, manufacturing defect, or like defect(s) could result in the interrupt or external signal being missed, mis-processed, electrically short-circuited, or the like resulting in the part being stuck in a low power mode forever. A designer cannot determine what went wrong with the integrated circuit since the designer cannot access the part due to tri-stated inputs, outputs, and I/O pins and disabled clock. Therefore, a need exists, for system diagnostic and test purposes, to allow for testing an integrated circuit while in low power mode, allow for verification of low power operation before entrance into low power mode, and to allow a way to force-exit a low power mode in order to access more internal information in the case of a defect. In conventional ICs, the inclusion of low power test circuitry does not allow an IC to attain a lowest-possible low power mode, which is disadvantageous.

Figure 1:
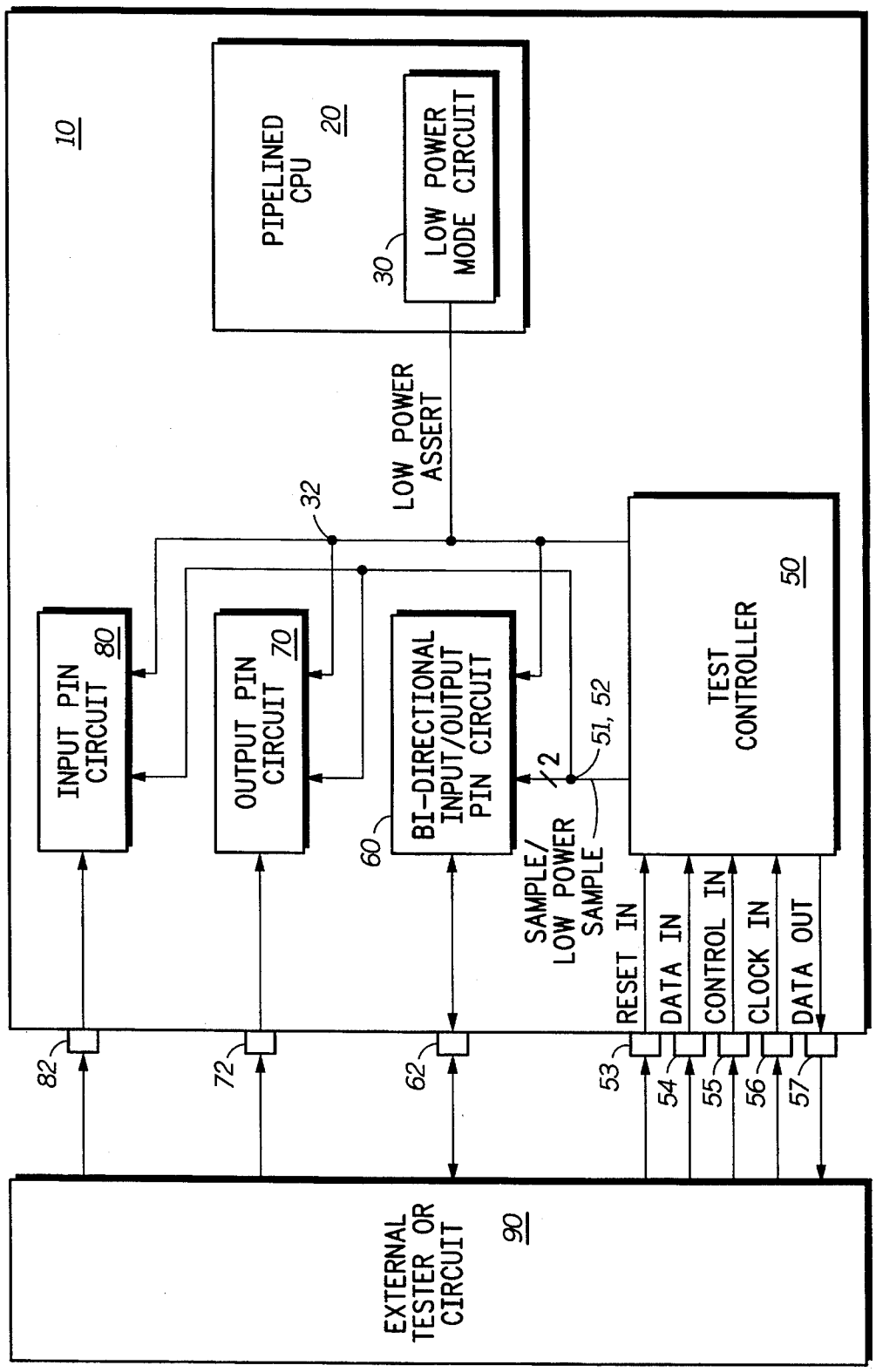
FIG. 1 illustrates, in a block diagram, a data processor having a low power mode and an external circuit for testing pin isolation in the low power mode in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

The present invention provides a circuit and method to conduct verification and diagnosis of certain low power mode logic which is used with VLSI (very large scale integrated) devices that support low power operation. The low power operation includes isolating one or more IC package pins (the external world) from the internal logic of the VLSI device.

Generally, a low power mode is a mode of operation in which the device consumes power at a lower rate than during normal functional operation. There are many methods by which a low power mode can be implemented for a processor or integrated circuit. The most common methods require the reduction of switching current by holding the logic values to inputs of logic circuits constant, and the reduction of DC current flow by disabling DC current paths (e.g., removing or disabling pull-ups and isolating constant or continuous source to drain current paths). Currently, low power modes are verified by conducting analog current measurements of a part to determine the power consumption rate of the part while the part is in low power mode. If the analog current measurement is too high, the part has current leaks or power draining junctions not properly terminated by the low power mode or has faults/defects creating excessive current flow. In this case, correction may be required to get the IC within low power specifications.

There are several problems that currently exist with conventional low power mode testing and low power mode determination. These problems are related to test, verification, and diagnosis of a device that supports a low power mode. One of the main problems is due to the required additional low power test logic needed on the IC in order to test low power mode operation The additional low power test logic on the IC is continuously always enabled whether in low power mode or normal mode of operation (i.e., the additional low power test logic has a clock, is switching, and does not tri-state pins like the rest of the integrated circuit). Therefore, the IC cannot obtain an absolute low power mode since this added test logic is always drawing power when the part is in low power mode. For many consumer applications, this enabling and continuous activation of a test portion of an IC could mean a loss of several hours or days of portable time/battery life and is unacceptable to many portable designs. The additional test logic is needed to enhance or allow logical testing and current measurement capabilities, restricting the ability of the device to achieve the lowest power level possible. The reasons for not achieving the lowest possible level of power consumption falls into two categories: (1) there is power consumed by the test logic while the test logic is remaining ready to test, but not actively being used for test, while the device is in a low power mode (the test logic itself consumes power); and (2) there is power consumed during low power testing while the on-chip test logic remains active (there is usually a violation of low power mode while testing low power mode).

Another fundamental problem occurs due to the isolated package pins in low power mode. With isolated pins, problems occur when attempting to apply logic value based test vectors to the device from external to the device via a logical based tester in order to conduct required verification of the low power operation of the device. The verification questions usually asked for a low power mode are: (1) "if the part is placed in low power mode and it draws too much current with an analog current measurement test, what is the source of the problem?"; and (2) "if the part is placed in the low power mode and is requested to exit the low power mode and it does not seem to 'wake up' to a normal mode of operation, what is the source of the problem?". These questions are difficult (or impossible) to answer when a part is running no clock and/or has all or most of it's external pins disconnected to attain the low power mode.

The question (1) from above has to do with isolating the source of current drain to either the incorrect operation of low power mode or to some other problem not related to low-power. The question (2) from above has to do with isolating the source or reason why the IC is not reacting to the exit low power mode condition (which is typically an applied external signal).

The methods and apparatus described here provide solutions to these low-power test problems/questions in a unique manner.

In general, the method taught herein allows testing of an IC during execution of the IC's low power mode, and also allows verification of the low power mode for any VLSI CMOS data processing device. The test taught herein is unlike current tests in that it is a logic test which is inexpensive and requires no high-dollar high-precision current measurements/equipment.

The IC is allowed to invoke the low power mode via a machine-language instruction, a control signal, an interrupt, an externally applied control sequence, or a like method. Once low power mode is invoked, the data processor's central processing unit forces its inputs into an "isolation" state and forces its outputs into a "three-state" or high impedance state while placing itself in a "stopped" state where no clock is operating as in normal mode. The isolation and high impedance is done to minimize current drain due to DC voltage mismatches between the data processor's external connections and its internal circuitry. For example, in many cases, a 3.3 volt device will interface with a 5 volt device or other voltage mismatches occur where current is constantly drawn through the pins even if the IC is nonfunctional or not changing state. The stopped state minimizes transistor switching which in turn minimizes the power dissipated since CMOS transistors only consume power (pass current) when switching between logic values. The absence of a clock ensures that transitions in logic states is minimized or completely eliminated thereby reducing power.

The method herein allows the data processor's test controller to remain in a low power "sleep" state as long as a test reset condition is met. The low power "sleep" state includes disabling current drain devices in the test controller such as "pull-up or pull-down" resistors which are required in case the test controller pins are left unterminated in a system. In addition, the low power "sleep" also involves placing the test controller logic in a non-switching state. This keeps the test controller from interfering with the data processor's ability to achieve the lowest power quiescent state possible. In other words, the test controller taught herein can be placed into a low power mode to allow the part to be placed into a lowest low-power state where the entire IC (including test logic) is sleeping. During low power mode entrance or once in the lowest low power mode, the reset condition to the test controller on the IC can be violated which will "wake-up" just the test controller portion of the IC so that the test controller on the IC can function to conduct low-power testing/verification while the rest of data processor remains in the low power state. In the alternative, the test controller can be selectively awakened so that the test controller can conduct tests to verify specific low power circuitry contained within the data processor while this circuitry is in operation.

This method of conducting low power tests and low power verification is unique in that it differs from most prior art methods which use an "either-or" implementation where the device is either in low power mode or it is being tested, but not both simultaneously. There is a need to conduct testing during the low power mode since the isolation of input pins, the tri-stating of output pins, and the stopping of internal switching makes the device immune to external investigation with standard industry tools (such as semiconductor device testers and logic analyzers) while in the low power state. The low power mode also may limit internal device investigation with specialized tools such as E-beam probers since the constant voltage values present internally will not allow resolution of logic states. Therefore, a test controller (and corresponding method) is taught herein which can selectively be put to sleep to provide a lowest low power mode for maximal battery and portable life, while also allowing the test controller to be awakened to test the low power mode of an IC while the low power mode is in operation (i.e., while pins are isolated).

The present invention will be more clearly understood with reference to FIGS. 1–4. FIG. 1 illustrates a data processor 10 and an external circuit 90. The data processor 10 comprises a central processing unit (CPU) 20, which includes a low power mode generation circuit 30. Data processor 10 comprises a plurality of input circuits or input buffers in reality, but only a single input circuit 80 coupled to an input pin 82 is illustrated in FIG. 1 for simplicity of illustration. Data processor 10 also comprises a plurality of output circuits or output buffers, but only a single output circuit 70 coupled to an output pin 72 is illustrated in FIG. 1 for simplicity of illustration. The data processor 10 can, depending upon the design, contain one or more bi-directional input/output circuits or buffer, but only a single bi-directional input/output circuit/buffer 60 coupled to a bi-directional input/output pin 62 is illustrated in FIG. 1 for simplicity of illustration. FIG. 1 illustrates a test controller unit 50 which is connected to five external package pin types illustrated as pins 53–57 of the processor 10. More than five pins can clearly be used to interface to the test controller 50 in other designs. Pins 53–57 are referred to as the test control pins.

The five pin inputs or outputs 53–57 to the test controller 50 are reset in 53, test data in 54, control in 55, clock in 56, and test data out 57. These five test signals/conductors/pins are discussed below in detail. The external circuit 90 is an external test controller which may be a small/inexpensive tester/circuit or a larger Teredyne or Advantest tester.

Input pins and circuits, like input pin 82 and circuit 80, are used to receive control, address, and/or data information from external sources which are external to the pins of processor 10. Output pins/circuits, like pin 72 and circuit 70 are used to output address, data, and/or control information to conductors external to the integrated data processor 10. Bi-directional pins/circuit are used to perform both input and output functions (usually in a time-multiplexed manner) for one or more of addresses, data, and control signals. It is important to note that there may be many other units in a data processor 10, such as bus interface units, floating point units, integer units, registers, cache regions, and the like, but these modules are not directly pertinent to the methods taught herein and are therefore not specifically illustrated.

A signal 52, referred to in the alternative as the low power sample signal or LP Sample, is output from the test controller 50 and input to each of the circuits/buffers 60, 70, and 80. Signal 52 is discussed below.

Figure 2:
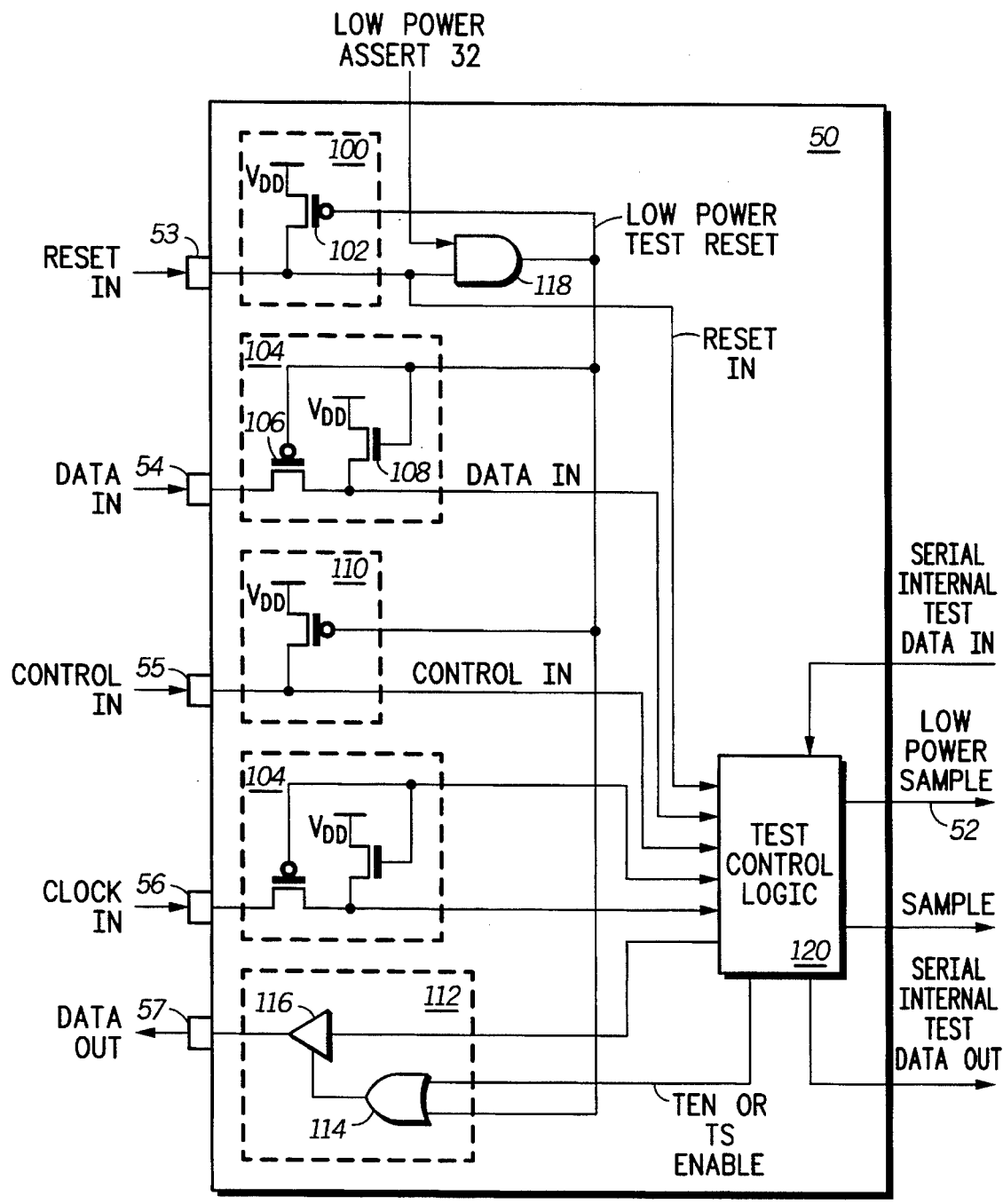
FIG. 2 illustrates, in a block diagram, the test controller and test external pins of FIG. 1.

FIG. 2 depicts, in more detail, the test controller unit 50 of FIG. 1. Unit 50 illustrates the five control pin types used, in general, for test controllers. These pin types are: a reset type pin 53 which can be used to place the test controller in the reset state; a data input type pin 54 which can be used to input data to the test controller; a control input type pin 55 which can be used to control the state or actions of the test controller; a clock input type pin 56 which can be used to synchronize all sequential actions of the test controller; and a data output type pin 57 which can be used to output data from the test controller. Each pin type requires a specific low power isolation circuit as illustrated via circuits 100, 104, 110 and 112 to allow the test controller to attain low power mode and send IC 10 into an aggregate lowest-possible low-power mode.

The purpose of including low power isolation circuits on each pin type in the test controller 50 is to allow the test controller 50 to enter a low power reset state which will isolate its input pins, three-state its output pins, and hold the test controller in a known benign state. The reset condition discussed above for test controller 50 is defined by the data processor being in the low power state as indicated by a low power mode signal 32 being asserted, and a test controller reset signal being asserted simultaneously. An alternate reset condition can also be met by using a control input signal 55 in conjunction with, or instead of the reset type pin 53. Therefore, the reset condition which allows test controller 50 to be into or out of low-power mode is a function of the reset in pin 53, low power assert 32, and optionally the control in pin 55. Once the reset condition is invoked, a set of low power isolation circuits 100, 104, 110, and 112, are activated. If the reset condition is violated, then the low power mode, only in the test controller, is exited. The remaining IC circuitry other than the test controller 50 remains in low power mode when the reset condition is violated.

For a reset type pin 53, a pull-up transistor 102 in a isolation circuit 100 is required so that the test controller 50 will remain benign if the test controller pins are left unterminated by the end user of the device. This assures a stable logic value is applied to the internal circuitry for reset-in. This pull-up transistor 102 may conflict with the low power requirement of the data processor by allowing a current drain path from the VDD source coupled to transistor 102 to the external world through pin 53. When the low power reset condition is invoked, the pull-up transistor 102 contained within the isolation circuit 100 is shut-off so that the path from VDD to pin 53 is broken by the assertion of a low power reset test signal 118. Therefore, when the test controller 50 is in low power mode, the pin 53 and it's connections contribute nothing in terms of leakage current which would otherwise affect low power mode.

For a data-in type pin 54, an isolation circuit 104 is used to attain low power mode. This isolation circuit 104 places an isolation transistor 106 serially in the input signal path and couples the input path with a pull-up transistor 108 which is coupled between VDD and the transistor 106. When the low power test reset 118 is asserted (logic one), the transistor 106 blocks the signal path from the pin 54 to the internal signal and applies the pull-up transistor 108 to the internal signal (i.e., transistor 108 is turned on when low power test reset signal 118 is active and transistor 106 is turned off). The pull-up transistor 108 is applied to prevent a mid-voltage level on an internal node which could result in metastability and current drain. This assures that a voltage mismatch between the external pin 54 connection and the internal logic does not occur in low power mode, thereby avoiding any net current flow via pin 54 when in low power mode.

For a control type pin 55, either the disable-able pull-up transistor circuit, like circuit 100, or the pin-isolation and pull-up circuit 104 may be used. The disable-able pull-up transistor circuit 100 would be used if the control signal were factored into the low power test reset signal 118. The pin-isolation and pull-up circuit 104 would be used if the control signal were to be treated exactly like the data signal and not be factored into the generation of signal 118 (which is one option). Circuit 110 is enabled when the test controller 50 is in a low power mode (signal 118 is a logic one) and control in is properly isolated as discussed above for other pins.

For a clock type pin 56, the pin-isolation and pull-up circuit 104 is used. However, depending on the type of clock, a synchronizer circuit may be used to re-apply the internal clock and align it with a free-running external clock so that glitches do not occur.

For a data-out type pin 57, a low power disable-able three-state driver circuit 112 is used as illustrated in FIG. 2. The low power test reset signal 118 is factored into and overrides the normal three-state enable signal via an OR-gate 114. This forces the connection between the internal logic and the external pin 57 to a high-impedance state which assures that a voltage mismatch does not occur thereby avoiding a net current flow when in low power mode. In circuit 112 of FIG. 2 is a tri-state buffer 116 which is used to selectively isolate pin 57 from the internal test control logic and CPU. A TS enable signal (test enable or TEN) is used to control whether the tri-state buffer is on or off.

When the low power reset condition is violated (i.e., reset in is a logic zero), then all pin connections to the test controller become valid/connected and the test controller can be used to conduct test operations while the rest of the IC is in a low power mode. If the low power reset condition is satisfied, the pins of FIG. 2 are isolated so that the lowest possible power level is attained in the processor 10. When the low power reset condition is violated, internal and/or external test operations can be performed even though the data processor may still be in the low power state with it's pins isolated and three-stated in order to analyze any low power errors or defects.

Some elements of operation must be checked/verified with the data processor 10 during the low power state. These elements of operations which must be checked/verified is that: (1) the lowest power dissipation possible is achieved or that the power dissipation is within specifications; and that (2) the device is in the low power state and can be awakened from the low power state to the normal operational mode(s). In addition, if the device fails to meet the expected low power current threshold by conventional direct measurement of the current drawn at its pins, then there is still a need to diagnose and isolate the reason or source of the excessive current draw/drain which current measurement cannot supply. If the low power machine instruction (or like operation) is processed to place the device into the low power state, then the need is to verify logically (not via current measurement) that the device has entered the low power state using test controller 50. If the device is in the low power state and awakened, then the need is to verify that the device has exited the low power state fully and properly. For example, if one pin does not come out of the low power mode and remains tri-state, the part will probably not function properly. A current measurement may find the pin stuck at the tri-state level, but may not be able to pinpoint the exact reason why the pin is stuck without the use of test controller 50. If the device does not exit the low power state at all, then the need is to diagnose and isolate the source of the failure to exit. All of these needs can be met by conducting two test operations discussed directly below using the test controller 50.

Investigating whether the device has entered the low power state or whether a source of current leakage is a non-isolated or three-stated pin such as 82, 72, 62, and their related circuits 80, 70, and 60, respectively, can be done by verifying that pin isolation transistors on the data processor pins 62, 72, and 82 are operating correctly. This is done by using a low power sample, henceforth known as LPSAMPLE 52 in FIG. 2, which is generated in a SAMPLE and LPSAMPLE generation test control logic circuit 120. In addition, the test control logic 120 has an input for serial internal test data in and an output for serial internal test data out in order to communicate input and output test data to internal scan chain(s) within the IC 10.

Investigating whether the device has entered or exited the low power state can be done by verifying that the pin isolation transistors on the data processor are not blocking the normal pin to internal signal path. This is done by using the SAMPLE control signal 51 (see FIG. 2).

The SAMPLE and LPSAMPLE functionality can be more fully understood with reference to FIGS. 3–7.

Figure 3:
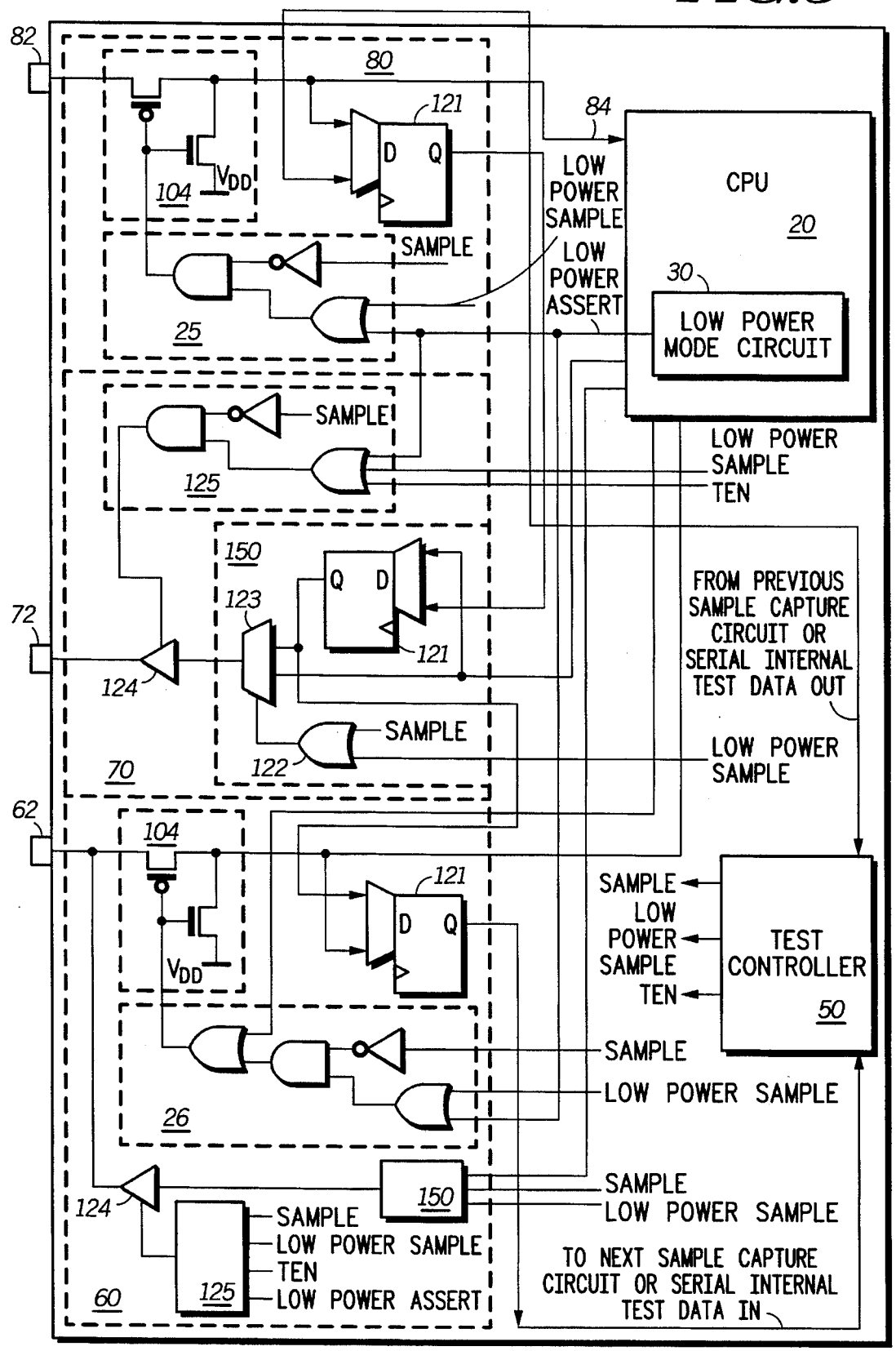
FIG. 3 illustrates, in a block diagram, the CPU, test controller, test controller signals, and CPU pins from FIG. 1 in more detail.

FIG. 3 illustrates the types of data processor pin connections that contain low power isolation circuitry. Pin 82 and corresponding input pin circuit 80 indicate a general purpose input pin. Pin 72 and output buffer circuit 70 indicate a general purpose output pin with a three-stateable (i.e., tristateable) output driver. Pin 62 and bi-directional buffer circuit 60 indicate a general purpose bi-directional pin with a three-stateable output driver. Connecting to all three example pins (there will most likely be many of each type of pin on an integrated circuit) is one of either a low power control circuit 25 or a low power control circuit 125 which allows SAMPLE, LPSAMPLE, and low power mode to be applied with the correct priority to operate or verify the low power isolation or three-state driver circuits of FIG. 3. It is important to note that each circuit 25 or 125 may be repeated or copied in each pin circuit 60, 70, or 80 or may be placed once on the chip and routed to all pins in order to preserve substrate surface area.

FIG. 3 illustrates, in greater detail than FIG. 1, the input pin circuit 80 from FIG. 1 and the low power control circuit 25. The input signal conducted via pin 82 must pass through an isolation and pull-up circuit identical or similar in function to circuit 104 of FIG. 2. Circuit 104 contains one P-channel MOS transistor in series with the input pin and one N-channel MOS transistor which is a pull-up transistor that coupled the internal input path to Vdd (optionally could be ground) when the P-channel transistor is off. Attached to the input signal is a test sample register or sample capture flip-flop 121 which is used to capture the value placed on pin 82 during the SAMPLE operation or the values placed by the pull-up transistor during the LPSAMPLE operation. The SAMPLE test operation is used to ensure that the connection from pin 82 to the CPU 20 is attainable while LPSAMPLE test operations ensure that the circuit 104 properly isolates pin 82 from the CPU and pulls the internal input signal 84 to a Vdd potential. It is important to note that the circuit 121 is a multiplexer and a flip-flop connected in a serial scan operable manner. The multiplexer in circuit 121 is selected by a shift/sample control signal supplied by the test controller and is not specifically illustrated in FIG. 3 since the type and operation of scan flip-flops is well known in the art and not overly pertinent to the operation of low power testing.

Circuit 25 shows the preferred embodiment for the control implementation of the SAMPLE, LPSAMPLE, and lower power mode control signals for an input circuit/buffer. During normal functional operation of the data processor, logic values placed on pin 82 are passed unimpeded into the data processor through an enabled P-channel transistor in circuit 104 and the SAMPLE, LPSAMPLE, and low power mode control signals are all deasserted (i.e. are all logic 0). If the SAMPLE control signal is asserted (i.e. logic 1) then a logic 0 is placed on the isolation P-channel and N-channel transistors in circuit 104 which forces circuit 104 to complete the connection of pin 82 to the internal signal regardless of the LPSAMPLE signal or the low power mode assert signal. This allows sample register 121 to capture the value present on the pin 82 to ensure a circuit path from pin 82 to CPU 20 via connection 84 is possible and uninhibited. In SAMPLE mode, one should be able to place a logic zero or logic one onto an external pin and capture that logic value (either zero or one) internally in a circuit 121.

If the LSAMPLE signal is asserted (note: the SAMPLE and LPSAMPLE signals are required to be mutually exclusive in a preferred form and this exclusivity is done in the signal generation circuit 120 of FIG. 2) then a logic 1 is placed on the P-channel isolation transistor and the N-channel pull-up transistor which breaks the connection between pin 82 and the internal signal and sample register 121 The pull-up value of Vdd is placed on the internal signal so that the internal signal will be captured by the sample register 121 verifying proper internal termination during low power mode. Asserting the low power mode signal results in the same sequence of events. However, while the low power assert signal is asserted, the SAMPLE control signal can override the low power assert and even though the device is in the low power mode, the isolation transistor will be disabled such that the connection between pin 82 and the internal signal is completed for test purposes. In LPSAMPLE mode, one should be able to place a logic zero on pin 82 and sample a logic one into circuit 121 due to pull-up transistor 104.

FIG. 3 illustrates in greater detail the output pin circuit 70. During normal operation signals pass from the data processor to the pin 72 through a three-stateable driver 124. Whether the signals arrive at pin 72 or are blocked at the three-stateable driver 124 depends on the value of TEN which is controlled by the data processor and/or the test controller. During low power mode the low power assert signal is asserted in circuit 125 exactly as described previously for circuit 80, and this also forces buffer 124 to present a high-impedance value to pin 72. As before, the SAMPLE control signal allow one to test that a signal path from the CPU 20 to the pin 72 is possible and functional whereas the LPSAMPLE signal allows one to test that the internal signal can be properly isolated from the pin 72 for low power mode. In order to perform these SAMPLE and LPSAMPLE test, a tester applies voltages (either 0s or 1s) internally via the scan chain circuit 121 in circuit 70. In the SAMPLE or LPSAMPLE test modes, the path from circuit 121 to buffer 124 is enabled via mux 123, else the normal mode of operation allows the path from CPU 20 to buffer 123 to be coupled through mux 123. For example, if the SAMPLE test mode is enabled and one writes a logic one or logic zero to the circuit 121 of circuit 70, a tester should be able to read this one or zero on the pin 72. If not, a problem exists in the circuitry 70. In LPSAMPLE mode, one should be able to place logical zeros or ones in the circuit 121 of circuit 70 and see only a tri-stated value on the pin 72. If this is not true, a lowest possible mode of power consumption cannot be entered by the integrated circuit 10 of FIG. 1.

FIG. 3 also illustrates in detail the circuit 60 for the bi-directional pin 62. Circuit 60 is simply a combination of circuit 70 and circuit 80 in parallel to allow both input and output operation. Therefore, the circuit 60 should be fully understood given the above description of circuit 70 and 80. FIG. 3 illustrates the test controller 50 wherein the serial scan chain(s) are illustrated for the IC 10.

Figure 4:
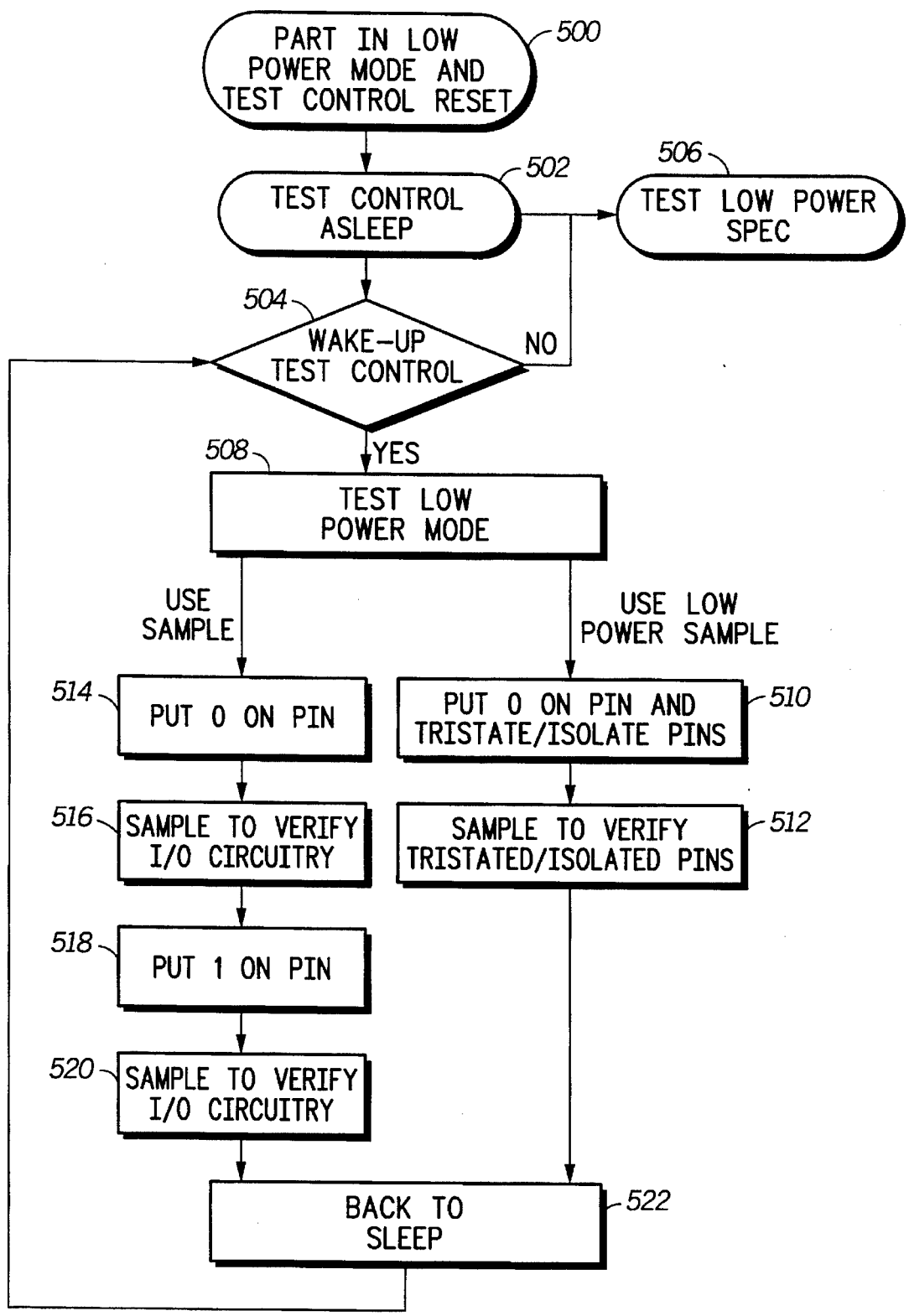
FIG. 4 illustrates, in a flowchart, a method for using the circuitry of FIGS. 1–3 to verify whether the low power isolation logic for integrated circuit pins is operational in accordance with the present invention.

FIG. 4 illustrates, in a flowchart, a process/method for using the circuitry of FIGS. 1–3 to test pin isolation in an integrated circuit with a low power mode of operation. In a step 500, the IC 10 is placed into a low power mode of operation. If the reset condition of the test controller is in a "wake-up state", the test controller will not be put to sleep with the rest of IC 10, but will remain awake to conduct testing. If the reset condition of the test controller is set so that the test controller goes to sleep with the rest of the IC 10, then the lowest power mode is entered with the IC 10 and the test controller being asleep. Therefore, the test controller may be put to sleep along with the rest of the IC 10 via a step 502, concurrent or after the step 500. The reset condition for the test controller 50 is used to wake up the test controller 50 (if not already awakened) via a step 504. If the test controller is not awakened, the IC 10 stays in the lower-most low power mode and testing can be done on this low power mode via conventional current measurements via step 506.

Once the test controller is awakened via step 504, the logic testing of low power mode via the test controller 50 can be performed. The testing is done in two different levels (one using a SAMPLE cycle and the other using the LPSAMPLE cycle). The SAMPLE method is taught via steps 514–520 and the LPSAMPLE cycle is taught via the steps 510–512.

For the SAMPLE cycle, logical zeros are placed onto the external pins via as step 514. The circuit 121 of FIG. 3, for the pin or pins being tested, are clocked to sample the internal line to see if the logic zero is properly transferred through the pull-up and isolation transistors (see step 516). If a zero is not properly read, then an error has occurred in the pull-up and isolation circuitry. A step 518 places a logic one onto the pin or pins under low-power testing and a sample step 520 is used to ensure (via the circuitry 121) that the logical one is properly transmitted internal to the processor 10. Once SAMPLE is done for all needed pins, either the IC 10 is placed into the lowest power mode via putting the test controller 50 back to sleep or the LPSAMPLE testing is conducted. All logical test and fault information can be received external to the IC 10 by shifting the data latched in the circuit 121 within the IC 10 through the test controller and to an external test circuit via the DATA OUT line of FIG. 1 in a well-known scan methodology.

For the LPSAMPLE cycle, a logic zero or logic one (the logic value that is opposite the value that is internally pulled-up to) is placed on the pin in a step 510 and the circuit 121 is clocked to sample the internal line. If the pull-up value is sampled in a step 512, then the line is properly isolated, if the external pin value or tri-state is read, then either the pull-up or the isolation circuitry is not functioning properly and this condition can be addressed. In a step 522, the entire integrated circuit can be placed back into a lowest power mode or remain in a test low power mode for more testing.

The logical testing of low power isolated pins is advantageous since the prior art relies on current measurement. The current measurement needs to be very accurate since a low power mode will typically draw micro-amperes of current and a bad junction or isolated pin may change this low power current by only a nano-ampere or a like quantity. Therefore, detection of small current increases is needed in the prior art. Given this logical method of testing, testing is compatible with current JTAG and scan test methodologies, is cheap, can be a user option or debug tool used while the part is installed in a system, avoids expensive current measurement equipment, and vastly aids testers and designers of ICs to find bugs in a low power mode of operation where previously no testing of low power mode entrance and exit could be done.

While the present invention has been illustrated and described with reference to specific embodiments, further modifications and improvements will occur to those skilled in the art. For example, the method taught herein may be used on memory chips and peripheral device other than CPUs or microprocessors. The method taught herein may be used on a board level or an IC level within a system. Plurality, as used herein is intended to mean any value between 2 and infinity and should not be limited to any particular subrange or constant when interpreting the meaning of plurality. Transistors, tri-state buffers, muxes, or any kind of electrical switch may be used to isolate pins in the method/apparatus taught herein. An integrated circuit may be connected to the external environment in one of several manners. For example, IC pins, IC terminals, direct wafer boding, ball bump technology, elastomer material, ball bonding, flip-chip and like technology may all be used to couple an IC to an external environment. Any of these external connection or external terminal techniques may be used with the IC taught herein. It is to be understood, therefore, that this invention is not limited to the particular forms illustrated and that it is intended in the appended claims to cover all modifications that do not depart from the spirit and scope of this invention.

What is claimed is:

1. A method for testing an integrated circuit while being in a low power mode of operation, the method comprising the steps of:

placing the integrated circuit into a low power mode of operation where a plurality of integrated circuit terminals which allow the integrated circuit to communicate external to the integrated circuit are electrically isolated from circuitry internal to the integrated circuit by low power circuitry within the integrated circuit and between the circuitry within the integrated circuit and the integrated circuit terminals;

enabling a test controller portion of the integrated circuit wherein the test controller portion, when enabled, can communicate through a plurality of test terminals with circuitry external to the integrated circuit while the integrated circuit terminals remain in low power isolation mode;

scanning test values through the test controller portion from external to the test controller portion, the test values being stored in storage locations which are coupled to the input through the low power circuitry; and placing predetermined voltage value on the plurality of integrated circuit terminals;

performing operations which use the test values in the storage locations to determine that the low power circuitry is operating properly in the low power mode of operation.

2. The method of claim 1 wherein the step of performing operations further comprises:

capturing test information in the storage locations where the test information is subsequently shifted out of the integrated circuit through the test controller portion so that the operation of the low power circuitry can be verified.

3. The method of claim 1 wherein the step of performing operations further comprises:

performing a first operation which ensures that the integrated circuit terminals can be isolated from the circuitry internal to the integrated circuit; and performing a second operation which ensures that the integrated circuit terminals can be brought out of low-power mode isolation to properly establish electrical connection to terminals for a normal mode of operation.

4. The method of claim 1 wherein the test controller portion is coupled to a data input terminal and a data output terminal wherein the data input terminal can be selectively placed into isolation for the low power mode and the data output terminal can be placed into isolation for the low power mode, the step of enabling the test controller portion comprising:

removing the data output terminal and the data input terminal from low power isolation so that data may be communicated to the test controller portion for low power testing while the integrated circuit terminals remain in a low power isolation state.

5. The method of claim 1 wherein the step of enabling a test controller portion comprises:

placing a predetermined value onto a reset condition terminal which is coupled to the test controller, the predetermined value allowing the test controller to come out of the low power isolation mode while keeping all other integrated circuit terminal in the low power isolation mode.

6. The method of claim 1 wherein the step of placing the integrated circuit into a low power mode is substantially concurrent in time with the step of enabling the test controller portion.

7. The method of claim 1 wherein the step of placing the integrated circuit into a low power mode occurs previous to the step of enabling the test controller portion where the test controller is placed into a low power mode for a time period along with the integrated circuit.

8. An integrated circuit comprising:

internal circuitry for performing a predetermined function;

external terminals coupled to the internal circuitry for allowing information to pass to and from the integrated circuit;

isolation circuitry coupled between the external terminals and the internal circuitry for isolating the external terminals from the internal circuitry when the integrated circuit enters into a low power mode of operation;

testing circuitry within the integrated circuit which can be taken out of low power isolation via an external signal, the external signal allowing the testing circuitry to externally communicate via terminals while keeping internal circuitry not associated with the testing circuitry in isolation from the external terminals, the testing circuitry performing operations, when awake, which logically verifies that the isolation circuitry is operating in a proper low power manner.

9. A test controller within an integrated circuit where the test controller comprises:

a reset input for allowing the test controller to come out of a low power mode while a rest of the integrated circuit remains in a low power mode with external terminals isolated from circuitry internal to the integrated circuit;

a data input for receiving test data from external to the integrated circuit;

a data output for providing test data from internal to the integrated circuit to external to the integrated circuit;

a clock input for receiving a clock signal for performing test operations while the rest of the integrated circuit remains in the low power mode;

circuitry within the test controller which provides test data and at least one control signal to the external terminals which are isolated from circuitry internal to the integrated circuit to verify that the external terminals are (1) properly isolated in low power mode and that (2) isolation of external terminals can be turned-off to allow for proper exiting of the low power mode to a normal mode of operation.

10. The test controller of claim 9 wherein the integrated circuit can be placed in a low power mode where the test controller is not is a low power mode but is instead fully functional while the rest of the integrated circuit, not including the test controller, is in a low power mode where external pins are electrically isolated from the rest of the integrated circuit not including the test controller.

11. The test controller of claim 10 wherein the test controller is used to logically test the rest of the integrated circuit to ensure that the rest of the integrated circuit can properly enter, maintain, and exit the low power mode.

12. The test controller of claim 9 wherein the integrated circuit can be placed into a lowest low power mode where the integrated circuit, including the test controller, is operating in a terminal-isolated low power mode.

13. The test controller of claim 9 wherein the data input and data output can be selectively electrically isolated from or selectively connected to the test controller when the integrated circuit is in low lower mode, this selective isolation or connection occurring in response to a voltage level conducted via the reset input.

14. The test controller of claim 9 wherein the clock input can be isolated from the test controller to further reduce power consumption in the integrated circuit when in low power mode.

15. The test controller of claim 9 wherein the at least one control signal comprises a sample control signal and a low power sample control signal, the sample control signal being used to ensure that the external terminals are properly coupled to the circuitry internal to the integrated circuit when not in the low power mode, the low power sample control signal being used to ensure that the external terminals are properly isolated and/or pulled-up when in low power mode.

16. The test controller of claim 9 wherein the low power mode is entered by receiving a low power control signal from a central processing unit (CPU) within the integrated circuit.

17. A method for testing isolation of external terminals of a data processor when in a low power mode, the method comprising the step of:

placing the data processor into a low power mode where the external terminals of the data processor are disconnected from a CPU by low power isolation logic within the data processor while a test controller in the data processor is also placed into a low power mode where test controller external terminals are isolated from the test controller;

providing a control signal to the test controller where the control signal is provided from either external or internal to the data processor, the control signal allowing the test controller external terminals to be connected to the test controller while the external terminals of the data processor remain isolated; and testing the external terminals of the data processor with the test controller while in low power mode to determine that the low power isolation logic with the data processor is operating properly.

18. The method of claim 17 wherein the step of testing comprises:

placing logical zeros on the external terminals and sampling a logic value internal to the data processor to ensure that the low power isolation logic is allowing the logic zeros to be transmitted internal to the data processor.

19. The method of claim 17 wherein the step of testing comprises:

placing logical ones on the external terminals and sampling a logic value internal to the data processor to ensure that the low power isolation logic is allowing the logic ones to be transmitted internal to the data processor.

20. The method of claim 17 wherein the step of testing comprises:

placing logical ones on the external terminals and sampling a logic value internal to the data processor to ensure that the low power isolation logic is allowing the logic ones to be transmitted internal to the data processor; and placing logical zeros on the external terminals and sampling a logic value internal to the data processor to ensure that the low power isolation logic is allowing the logic zeros to be transmitted internal to the data processor.

21. The method of claim 17 wherein the step of testing comprises:

placing a test voltage on the external terminals wherein the test voltage is opposite an internal pull-up voltage that is set internally when the data processor is in low power mode; and reading an internal voltage level internal to the data processor to determine if the test voltage or the internal pull-up voltage is internally active.

22. The method of claim 21 wherein the step of reading comprises:

identifying an error when the test voltage is detected since the low power isolation circuitry is not operating properly and is instead allowing the test voltage to be improperly transmitted internal to the data processor.

23. The method of claim 17 wherein the step of testing comprises:

running the step of testing in either a normal mode of operation or a low power mode of operation.

24. The method of claim 17 wherein the step of testing comprises:

scanning test data into the data processor through the test controller, the test data being scanned and stored in the data processor by a plurality of serial scan chain cells which are used to test the data processor when in low power mode.

25. The method of claim 24 wherein the step of testing comprises:

scanning low power test result data out from the data processor through the test controller, the low power test result data being scanned out and stored in the data processor by the plurality of serial scan chain cells.

26. An integrated circuit comprising:

internal circuitry for performing a predetermined operation;

isolation circuitry coupled to the internal circuitry;

external terminals coupled to the isolation circuitry, the external terminals being isolated from the internal circuitry in a low power mode of operation but being coupled to the internal circuitry when in the integrated circuit is in a normal mode of operation;

test control circuitry within the integrated circuit, the test control circuitry being coupled to the isolation circuitry by test control signals;

test isolation circuitry coupled to the test control circuitry; and test external terminals coupled to the test isolation circuitry, the test external terminals being coupled to the test control circuitry via the test isolation circuitry in response to a reset control signal coupled to the test isolation circuitry, the reset control signal allowing the test control signals to test the isolation circuitry via the test control signals to ensure that the integrated circuit can properly enter and exit the low power mode of operation.

27. The integrated circuit of claim 26 wherein the isolation circuitry for an input terminal comprises a first transistor in series with the input terminal and a second transistor which pulls an internal conductor coupled to the input terminal to a predetermined voltage when in low-power mode.

28. The integrated circuit of claim 27 wherein the isolation circuitry for the input terminal comprises a storage cell coupled to the internal conductor for storing test data for testing the input terminal when in low-power mode.

29. The integrated circuit of claim 27 wherein the isolation circuitry for the input terminal comprises input control circuitry for receiving two control signals from the test control circuitry, the input control circuitry selectively enabling and disabling the first and second transistors to allow for testing of the low power mode.

30. The integrated circuit of claim 26 wherein the isolation circuitry for an output terminal comprises a tri-state buffer which isolates an internal conductor from the output terminal when in low-power mode.

31. The integrated circuit of claim 30 wherein the isolation circuitry for the output terminal comprises a storage cell coupled to the internal conductor for storing test data for testing the output terminal when in low-power mode.

32. The integrated circuit of claim 30 wherein the isolation circuitry for the output terminal comprises output control circuitry for receiving two control signals from the test control circuitry, the output control circuitry selectively enabling and disabling the tri-state buffer to allow for testing of the low power mode.

33. The integrated circuit of claim 26 wherein the isolation circuitry for a bi-directional terminal comprises control circuitry which test both input paths and output paths in the bi-directional terminal to ensure proper operation of the low power mode.

* * * * *

UNITED STATES PATENT AND TRADEMARK OFFICE
CERTIFICATE OF CORRECTION

PATENT NO. : 5,561,614
DATED : October 1, 1996
INVENTOR(S) : Juan G. Revilla and Alfred L. Crouch It is certified that error appears in the above-indentified patent and that said Letters Patent is hereby corrected as shown below:

Column 11, line 71, change "low power isolation", to --low power operation--.
Column 12, line 31, change "is not is", to --is not in--.
Column 12, line 46, change "low lower", to --low power--.

Signed and Sealed this

Seventh Day of October, 1997

Attest:

BRUCE LEHMAN

Attesting Officer  Commissioner of Patents and Trademarks